Patented Nov. 14, 1939

2,179,984

UNITED STATES PATENT OFFICE 2,179,984

PROCESS FOR THE MANUFACTURE OF THIAZOLES HAVING A HYDROGEN ATOM IN THE 2-POSITION

Hans Spiegelberg, Basel, Switzerland, assignor to Hoffmann-La Roche, Inc., Nutley, N. J., a corporation of New Jersey No Drawing. Application February 12, 1938, Serial No. 190,332. In Switzerland March 12, 1937

4 Claims. (Cl. 260—302)

Thiazoles having a hydrogen atom in the 2-position can be obtained by diazotisation of 2-amino-thiazoles and boiling the resulting diazo compounds with alcohol or by reduction of 2-chloro-thiazoles. The 2-chloro-thiazoles are obtained from amino- or hydroxy-thiazoles. These processes are complicated and the yields not satisfactory. Thiazoles having a hydrogen atom in the 2-position can also be directly obtained from thioformamide. In most cases, however, the reaction of this compound with halogenated aldehydes or ketones does not proceed very smoothly, quite apart from the fact that the manufacture of even impure thioformamide is complicated and expensive.

It has now been found that 2-mercapto-thiazoles, easily obtainable in excellent yield from α-halogen-ketones and ammonium dithiocarbamate (Gazzetta Chimica Italiana 61 (1931) page 719) can surprisingly easily be converted in a single process in good yield into the corresponding thiazoles having a hydrogen atom in the 2-position if they are oxidised in acid solution with hydrogen peroxide. In this way the unstable sulphinic acids are first formed and these already split off sulphur dioxide at a comparatively low temperature. This, however, is preferably oxidised immediately to sulphuric acid by the addition of more hydrogen peroxide. Sulphuric acid can then easily be removed from the reaction mixture by precipitation with barium chloride and in this manner a solution of the thiazole in hydrochloric acid is obtained from which the salt or, if necessary, the base can be separated in the usual manner. The reaction in accordance with the present invention proceeds in accordance with the formula given below. In the structural formula employed, R and R′ represent alkyl or substituted alkyl radicals.

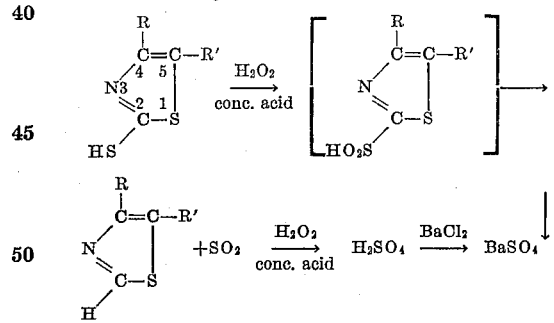

Example 1

58 parts by weight of 2-mercapto-4,5-dimethyl-thiazole (prepared from 2-bromo-butanone-(3) and ammonium thiocarbamate) are mixed with 240 parts by weight of hydrochloric acid of specific gravity 1.18 and 136 parts by weight of hydrogen peroxide (30% by weight) slowly run into the mixture. By efficient cooling and regulating the addition of hydrogen peroxide, the temperature of the reaction mixture is kept at 65–70° C. When all the oxidising agent has been added, the product is heated to 80° C. and the resulting sulphuric acid precipitated as barium sulphate by the addition of a solution of 100 parts by weight of barium chloride ($BaCl_2.2H_2O$) in 300 parts by weight of water. After filtering off the precipitate and evaporating the filtrate in vacuo, 4,5-dimethyl-thiazole hydrochloride still containing small quantities of barium chloride is obtained as residue. The former can be separated by dissolving in highly concentrated alcohol. The yield is nearly quantitative. At atmospheric pressure the free 4,5-dimethyl-thiazole boils at 156° C.

Example 2

193.5 parts by weight of 2-mercapto-4-methyl-5-(β-chloro-ethyl)-thiazole (melting point 128° C., prepared from 1,3-dichloro-pentanone-(4) and ammonium-dithiocarbamate) are dissolved in 600 parts by weight of 35% hydrochloric acid and oxidised at 60° C. by the gradual addition of 340 parts by weight of 30% hydrogen peroxide with cooling. Then sulphuric acid is precipitated by the addition of a solution of barium chloride, avoiding an excess, and filtered off from barium sulphate. For the separation of the dissolved 4-methyl-5-(β-chloro-ethyl)-thiazole, the solution which has been treated with decolorising carbon can be evaporated to dryness in vacuo. By dissolving the residue in absolute alcohol and precipitation with anhydrous ether, 4-methyl-5-(β-chloro-ethyl)-thiazole hydrochloride is obtained in a pure state. The yield amounts to 172 parts by weight, i. e., nearly 87% of the quantity calculated.

For the purification of the thiazole the difficultly soluble picrate melting at 140° C. can also be used.

Example 3

173 parts by weight of 2-mercapto-4-methyl-5-(β-acetoxyethyl)-thiazole melting at 93° C. (from 1-acetoxyethyl-3-chloro-pentanone-(4) and ammonium dithiocarbamate) are dissolved in 500 parts by weight of hydrochloric acid (specific gravity 1.18) and gradually treated with 272 parts by weight of hydrogen peroxide (30% by weight)

while stirring and cooling thoroughly. The temperature of the solution is kept at 60–70° C. After the addition of the oxidising agent has been completed the product is heated to 80° C. and treated with a hot solution of 195 parts by weight of crystalline barium chloride in 600 parts by weight of water. After filtering off the barium sulphate, the filtrate is concentrated in vacuo.

The separation and purification of the product is carried out as described in Example 1. In addition to replacing the mercapto group in the 2-position by hydrogen, the acetyl group is removed by hydrolysis during the reaction under the conditions described above, so that 4-methyl-5-hydroxyethyl-thiazole is obtained as the final product. More than 75% of the theoretical quantity of distilled base are obtained.

I claim:

1. A process for the manufacture of 4-methyl-5-hydroxyethyl-thiazole which comprises reacting hydrogen peroxide with 2-mercapto-4-methyl-5-(β-acetoxyethyl)-thiazole in concentrated hydrochloric acid solution, maintaining a temperature substantially at or below 70° C. during the addition of hydrogen peroxide and adding barium chloride to precipitate the sulphuric acid formed.

2. A process for the manufacture of 4-methyl-5-hydroxyethyl-thiazole which comprises reacting hydrogen peroxide with 2-mercapto-4-methyl-5-(β-acetoxyethyl)-thiazole in concentrated hydrochloric acid solution, maintaining a temperature substantially at or below 70° C. during the addition of hydrogen peroxide, adding barium chloride to precipitate the sulphuric acid formed and evaporating the solution to separate the thiazole.

3. A process for the manufacture of thiazoles having a hydrogen atom in the 2-position which comprises reacting hydrogen peroxide with 2-mercapto thiazoles in a concentrated acid solution, maintaining the temperature substantially at or below 70° C. during the addition of hydrogen peroxide and adding barium chloride to precipitate the sulphuric acid formed.

4. A process for the manufacture of thiazoles having a hydrogen atom in the 2-position which comprises reacting hydrogen perioxide with 2-mercapto thiazoles in a concentrated acid solution, maintaining the temperature substantially at or below 70° C. during the addition of hydrogen peroxide, adding barium chloride to precipitate the sulphuric acid formed and evaporating the solution to separate the thiazole.

HANS SPIEGELBERG.